(12) United States Patent
Dreyband et al.

(10) Patent No.: US 11,272,007 B2
(45) Date of Patent: Mar. 8, 2022

(54) UNIFIED AGENT FRAMEWORK INCLUDING PUSH-BASED DISCOVERY AND REAL-TIME DIAGNOSTICS FEATURES

(71) Applicant: ServiceNow, Inc., Santa Clara, CA (US)

(72) Inventors: Yevgeny Dreyband, Santa Clara, CA (US); Jason Ziccardi, San Diego, CA (US); Vishal Rao, Waltham, MA (US); Sreenevas Subramaniam, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/934,336

(22) Filed: Jul. 21, 2020

(65) Prior Publication Data
US 2022/0030064 A1    Jan. 27, 2022

(51) Int. Cl.
*H04L 29/08*    (2006.01)
*G06F 16/28*    (2019.01)
(Continued)

(52) U.S. Cl.
CPC ........ *H04L 67/1097* (2013.01); *G06F 9/4416* (2013.01); *G06F 16/288* (2019.01); *H04L 67/26* (2013.01); *H04L 67/28* (2013.01)

(58) Field of Classification Search
CPC ..... H04L 67/1097; H04L 67/26; H04L 67/28; G06F 16/288; G06F 9/4416
(Continued)

(56) References Cited

U.S. PATENT DOCUMENTS 4,941,084 A    7/1990    Terada et al.
5,185,860 A    2/1993    Wu
(Continued)

FOREIGN PATENT DOCUMENTS

EP    0433979    6/1991
EP    1607824    12/2005
(Continued)

OTHER PUBLICATIONS

Mike Arpaia, "Introducing osquery—Facebook Code," https://code.fb.com/security/introducing-osquery/, Feb. 15, 2019.
(Continued)

*Primary Examiner* — Tauqir Hussain
(74) *Attorney, Agent, or Firm* — McDonnell Boehnen Hulbert & Berghoff LLP

(57) ABSTRACT

Persistent storage may include a configuration management database (CMDB), the CMDB representing devices and software applications disposed within a managed network and relationships therebetween. A proxy server may be configured to relay discovery information between a plurality of endpoint devices associated with the managed network and the CMDB, wherein respective discovery agents are disposed within each of the endpoint devices, and wherein the proxy server contains one or more processors configured to execute program instructions that perform operations including: (i) receiving, from a discovery agent disposed within an endpoint device, a discovery payload, wherein the discovery payload includes: a configuration of the endpoint device and information regarding one or more software applications installed on the endpoint device, and wherein the proxy server did not request the discovery payload; and (ii) transmitting, by the proxy server, the discovery payload to the CMDB.

17 Claims, 12 Drawing Sheets

(51) Int. Cl.
*G06F 9/4401* (2018.01)
*H04L 67/1097* (2022.01)
*H04L 67/56* (2022.01)
*H04L 67/55* (2022.01)

(58) Field of Classification Search
USPC ........................................................ 709/219
See application file for complete search history.

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,778,972 B1 * | 8/2010 | Cormie .................. G06F 3/067 707/626 |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,600,941 B1 * | 12/2013 | Raj ..................... G06F 11/1448 707/640 |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,098,555 B2 | 8/2015 | Bjork et al. | |
| 9,374,351 B1 * | 6/2016 | Basha ................. H04L 63/0807 |
| 9,830,230 B1 * | 11/2017 | Rai ..................... G06F 11/1458 |
| 10,079,730 B2 | 9/2018 | Subramanian et al. | |
| 10,177,977 B1 * | 1/2019 | Avramov ............ H04L 41/0886 |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2004/0139227 A1 * | 7/2004 | Takeda .............. H04L 29/12066 709/245 |
| 2005/0015217 A1 | 1/2005 | Weidl et al. | |
| 2005/0050537 A1 * | 3/2005 | Thompson ............ G06F 16/289 717/165 |
| 2005/0091356 A1 | 4/2005 | Izzo | |
| 2006/0026453 A1 | 2/2006 | Frost et al. | |
| 2006/0084417 A1 | 4/2006 | Melpignano et al. | |
| 2006/0095461 A1 | 5/2006 | Raymond | |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0288389 A1 | 12/2007 | Vaughan et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0124284 A1 | 5/2009 | Scherzer et al. | |
| 2009/0228984 A1 | 9/2009 | Sterin | |
| 2010/0071053 A1 * | 3/2010 | Ansari ................ H04L 12/2818 726/12 |
| 2010/0110932 A1 | 5/2010 | Doran et al. | |
| 2010/0175134 A1 * | 7/2010 | Ali-Ahmad ............ G06F 3/048 726/24 |
| 2011/0041003 A1 * | 2/2011 | Pattar .................... H04W 12/10 714/4.3 |
| 2011/0055191 A1 * | 3/2011 | Bain ....................... G06F 16/83 707/706 |
| 2012/0016706 A1 | 1/2012 | Pargaonkar et al. | |
| 2013/0298230 A1 * | 11/2013 | Kumar ................ H04L 63/1425 726/22 |
| 2015/0212990 A1 * | 7/2015 | Tseng .................... G06F 9/451 715/234 |
| 2015/0358482 A1 | 12/2015 | Schouwenburg et al. | |

(56) References Cited

U.S. PATENT DOCUMENTS

| | | | | |
|---|---|---|---|---|
| 2015/0365309 | A1* | 12/2015 | Kaminski | H04L 43/0817 |
| | | | | 709/224 |
| 2016/0036716 | A1* | 2/2016 | Pal | H04L 69/329 |
| | | | | 709/207 |
| 2016/0364281 | A1* | 12/2016 | Lange | G06F 11/3466 |
| 2016/0366021 | A1* | 12/2016 | Baron | H04L 41/12 |
| 2017/0103223 | A1* | 4/2017 | Deulgaonkar | G06F 9/544 |
| 2017/0264480 | A1* | 9/2017 | Delegard | H04L 41/082 |
| 2018/0123940 | A1* | 5/2018 | Rimar | H04L 45/02 |
| 2018/0146049 | A1* | 5/2018 | Africa | H04L 41/0886 |
| 2018/0287907 | A1* | 10/2018 | Kulshreshtha | H04L 41/064 |
| 2018/0324030 | A1* | 11/2018 | Dang | H04L 41/22 |
| 2018/0324159 | A1* | 11/2018 | Koya | H04L 63/045 |
| 2019/0050220 | A1* | 2/2019 | Daum | H04L 67/34 |
| 2019/0104398 | A1* | 4/2019 | Owen | H04L 41/22 |
| 2019/0132389 | A1* | 5/2019 | Lillie | H04L 67/1095 |
| 2019/0166208 | A1* | 5/2019 | Shi | G06F 9/45558 |
| 2019/0205183 | A1* | 7/2019 | Provencher | G06F 9/44505 |
| 2019/0268423 | A1* | 8/2019 | Shah | H04L 67/2838 |
| 2019/0320385 | A1 | 10/2019 | Bhartia et al. | |
| 2020/0026787 | A1* | 1/2020 | Alam | G06F 16/2379 |
| 2020/0137148 | A1 | 4/2020 | Segal et al. | |
| 2021/0064360 | A1* | 3/2021 | Moser | G06F 9/541 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

"Nexthink / Incident Management for ServiceNow," https://www.nexthink.com/platform/integration/servicenow/, Jul. 6, 2020.

"Welcom to osquery—osquery," osquery.readthedocs.io/en/stable, downloaded from Internet on Jul. 6, 2020.

Caleb Hailey, "Sensu, The Missing Link in Hybrid Cloud Operations: the Monitoring Event Pipeline," sensui.io/resources/whitepaper/workflow-automation-for-monitoring, downloaded from Internet on Jul. 6, 2020.

Uptycs, "Live & Historical Incident Investigation", cdn2.hubspot.net/hubfs/2617658/Product%20One%20Pagers/Uptycs%20for%20Incident%20Investigation%20PDF%20(1).pdf, downloaded from Internet on Jul. 6, 2020.

Non-Final Office Action, U.S. Appl. No. 17/152,539, dated Oct. 15, 2021, 8 pages.

* cited by examiner

UNIFIED AGENT FRAMEWORK INCLUDING PUSH-BASED DISCOVERY AND REAL-TIME DIAGNOSTICS FEATURES

BACKGROUND

Discovery of devices and software applications on a managed network has become an important aspect of being able to operate such a network. Typically, discovery is an automated process controlled by a remote network management platform and can scan devices disposed within the managed network. The results of these scans may characterize the hardware of these devices and the software applications disposed thereon as configuration items. In some cases, relationships between configurations items may also be discernable. Configuration items may be stored in a configuration management database (CMDB) of the remote network management platform.

Traditional discovery is agentless, in that no discovery-assisting software is deployed on devices in order for the devices to be discovered. As a consequence, discovery is often limited to discovering devices that are relatively static—e.g., devices that rarely disconnect from networks, rejoin networks, or change networks and network parameters. Thus, traditional discovery often omits endpoint devices that exhibit mobility, such as laptops, tablets, and smartphones. Further, it can be challenging for traditional discovery identify ephemeral computing resources, such as on-demand virtual machines, that may be activated or deactivated in a frequent and unpredictable fashion.

SUMMARY

The embodiments herein employ agent-based discovery to facilitate a number of advantageous advances in discovery and discovery-related technologies. Particularly, endpoint devices associated with a managed network may be configured with agents—software operating on the endpoints that can facilitate discovery and other operations by executing commands on the endpoint devices and providing the output to a remote network management platform. Thus, the hardware configurations of these devices, the software applications installed on these devices, as well as operational relationships between the hardware and software of one or more devices can be determined and stored as configuration items in a CMDB.

Agent-based discovery can be used to replace, partially replace, or complement agentless discovery. For example, an agent may be able to detect information that might be more difficult for traditional agentless discovery procedures to identify. Further, agent-based discovery can be push-based, in contrast to traditional discovery which is pull-based. In this way, mobile or ephemeral endpoint devices can proactively report their discovery information rather than waiting for requests to do so. This can result in discovery being successfully performed more frequently, especially on ephemeral devices.

Additionally, the agent-based framework described herein can be used for obtaining real-time operational information regarding the performance of endpoint devices. As an example how this capability can be used, a user may determine or suspect that a device is not operating as desired. Diagnosing the issue often requires direct access to this device so that commands can be executed and configurations can be viewed. But with the agent-based framework in place, a request for real-time operational information can be transmitted to the device. The agent on the device might respond by determining, for example, a processor utilization of the device, a memory utilizations of the device, and a list of applications executing on the device, and replying to the request with this information. From this information, it can more easily be determined whether any particular operational aspect of the device is causing or contributing to a problem experienced by the user.

The agent-based framework may also facilitate improvements to software asset management and security operations. For the former, software inventories within an enterprise can be more easily and accurately determined. For the latter, malware, misconfigurations, vulnerabilities, and other issues can be detected more reliably. Other advantages may also exist.

Accordingly, a first example embodiment may involve persistent storage, including a CMDB representing devices and software applications disposed within a managed network and relationships therebetween. The first example embodiment may also involve a proxy server configured to relay discovery information between a plurality of endpoint devices associated with the managed network and the CMDB, wherein respective discovery agents are disposed within each of the endpoint devices, and wherein the proxy server contains one or more processors configured to execute program instructions that perform operations including: (i) receiving, from a discovery agent disposed within an endpoint device of the plurality of endpoint devices, a discovery payload, wherein the discovery payload includes: a configuration of the endpoint device and information regarding one or more software applications installed on the endpoint device, and wherein the proxy server did not request the discovery payload; and (ii) possibly in response to receiving the discovery payload, transmitting, by the proxy server, the discovery payload to the CMDB, wherein reception of the discovery payload causes the CMDB to store at least part of the discovery payload.

A second example embodiment may involve persistent storage, including an operational database representing operational characteristics of a plurality of endpoint devices disposed within a managed network. The second example embodiment may also involve a proxy server configured to relay operational information between the plurality of endpoint devices and the operational database, wherein respective monitoring agents are disposed within each of the endpoint devices, and wherein the proxy server contains one or more processors configured to execute program instructions that perform operations including: (i) receiving an operational request for real-time operational information of an endpoint device of the plurality of endpoint devices; (ii) transmitting, to a monitoring agent disposed within the endpoint device, the operational request; (iii) receiving, from the monitoring agent, an operational payload, wherein the operational payload includes: a processor utilization of the endpoint device, a memory utilization of the endpoint device, and a list of software applications executing on the endpoint device; and (iv) possibly in response to receiving the operational payload, transmitting, by the proxy server, the operational payload to the operational database, wherein reception of the operational payload causes the operational database to store at least part of the operational payload.

A third example embodiment may involve receiving, by a proxy server and from an endpoint device associated with a managed network, a register message identifying that the endpoint device seeks to establish a registration with the proxy server and is configured carry out agent-based discovery. The third example embodiment may further involve transmitting, by the proxy server and to the endpoint device, an acceptance of the registration. The third example embodiment may further involve receiving, by the proxy server and from a discovery agent disposed within the endpoint device, a discovery payload, wherein the discovery payload includes: a configuration of the endpoint device and information regarding one or more software applications installed on the endpoint device, and wherein the proxy server did not request the discovery payload. The third example embodiment may further involve, possibly in response to receiving the discovery payload, transmitting, by the proxy server and to a CMDB, the discovery payload, wherein the CMDB represents devices and software applications disposed within the managed network and relationships therebetween, and wherein reception of the discovery payload causes the CMDB to store at least part of the discovery payload.

A fourth example embodiment may involve receiving, by the proxy server, an operational request for real-time operational information of the endpoint device. The fourth example embodiment may further involve transmitting, by the proxy server and to a monitoring agent disposed within the endpoint device, the operational request. The fourth example embodiment may further involve receiving, by the proxy server and from the monitoring agent, an operational payload, wherein the operational payload includes: a processor utilization of the endpoint device, a memory utilization of the endpoint device, and a list of the software applications executing on the endpoint device. The fourth example embodiment may further involve, possibly in response to receiving the operational payload, transmitting, by the proxy server, the operational payload to an operational database, wherein the operational database represents operational characteristics of a plurality of endpoint devices disposed within the managed network, and wherein reception of the operational payload causes the operational database to store at least part of the operational payload.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system may include various means for carrying out each of the operations of the first, second, third, and/or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
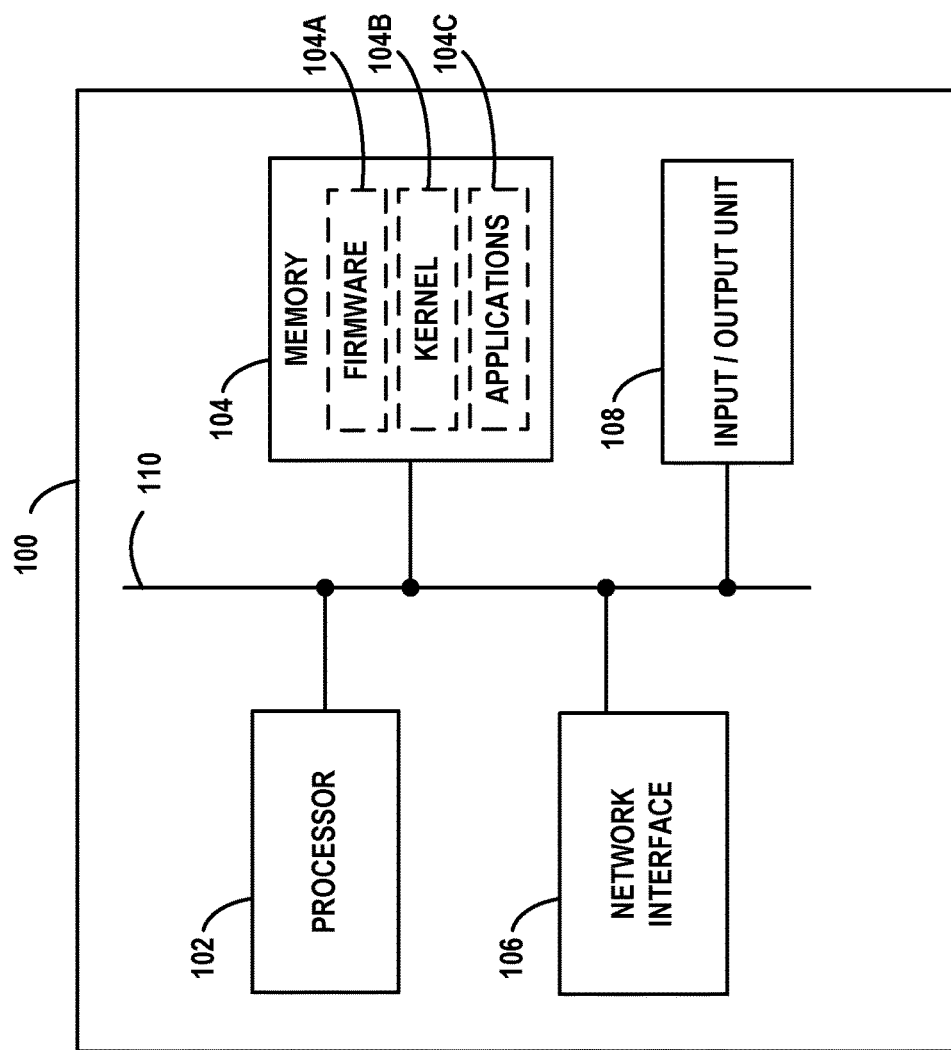
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
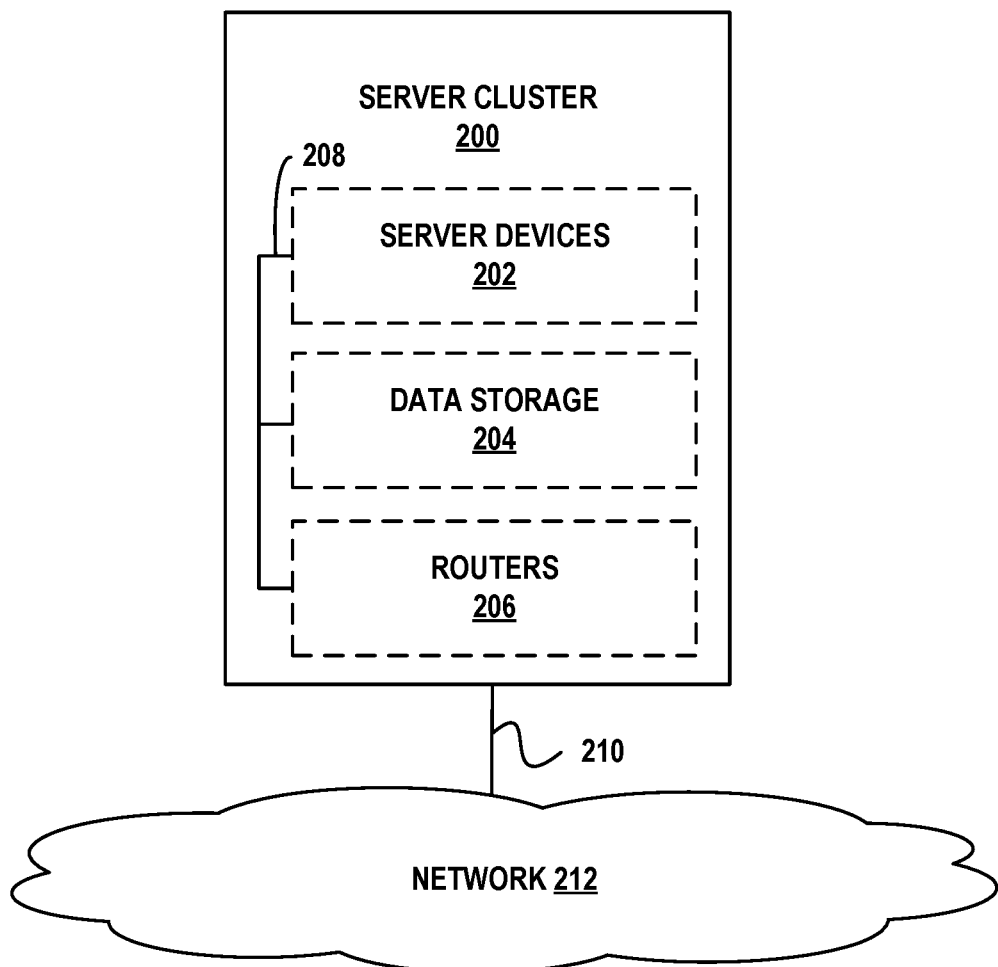
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
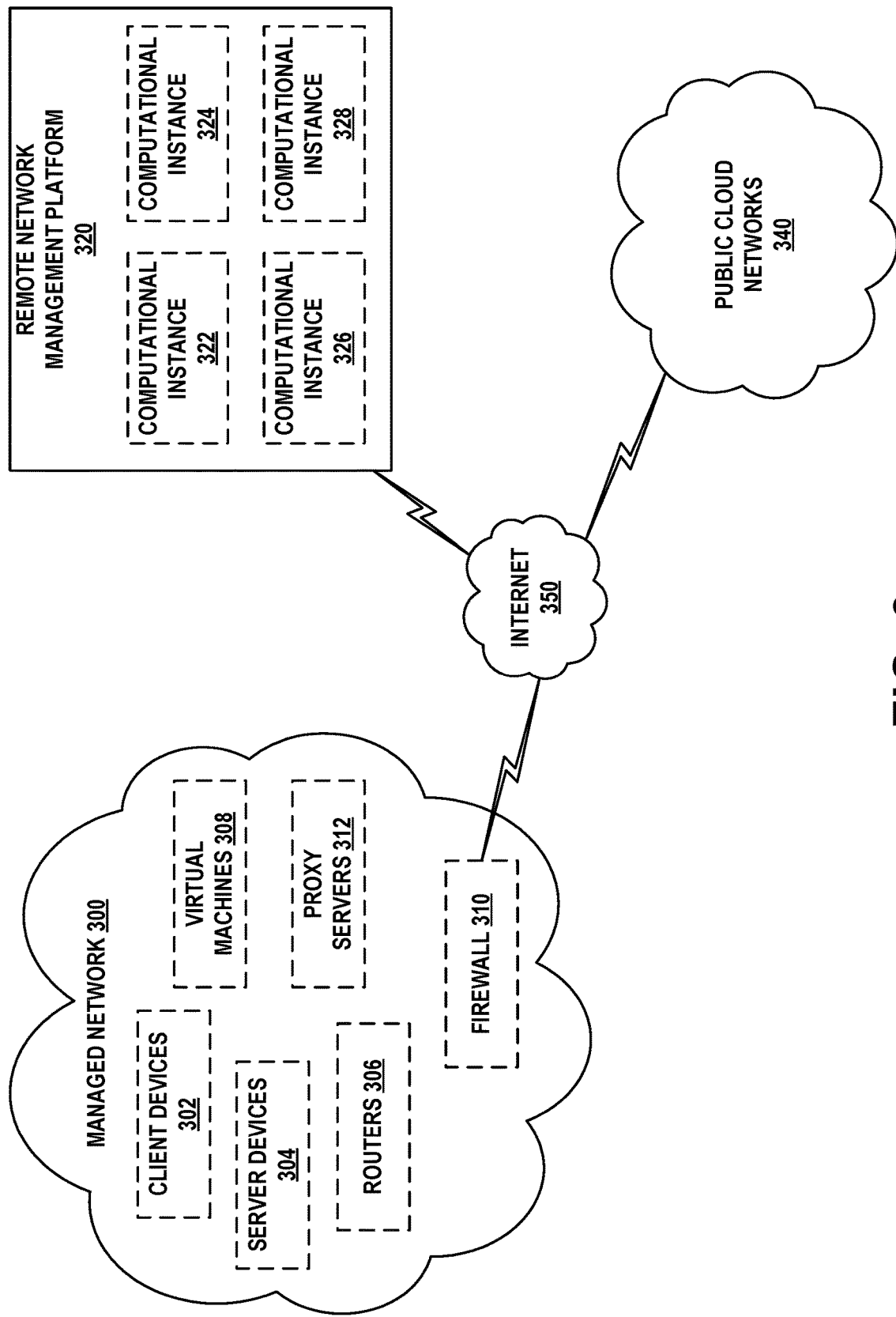
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
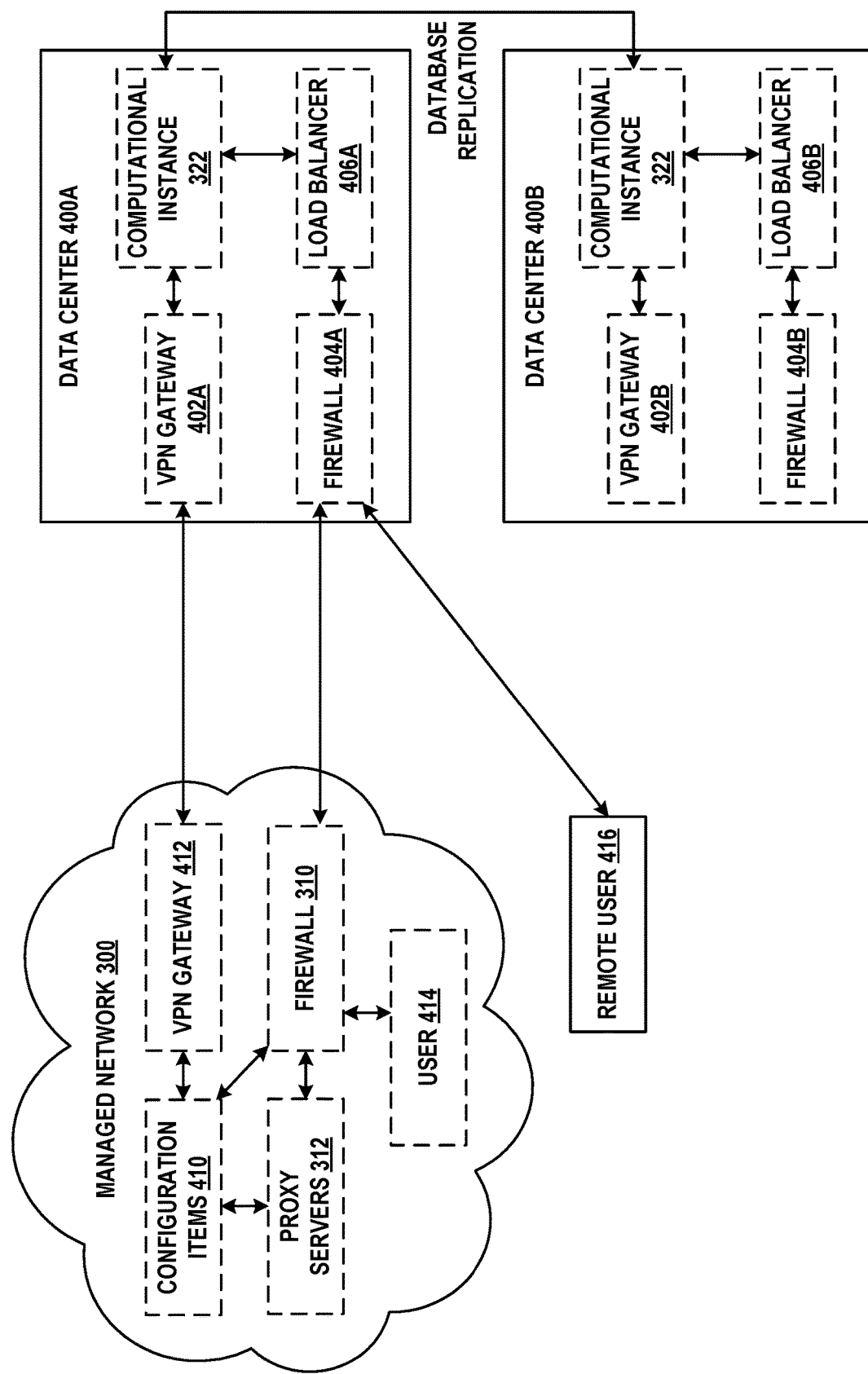
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
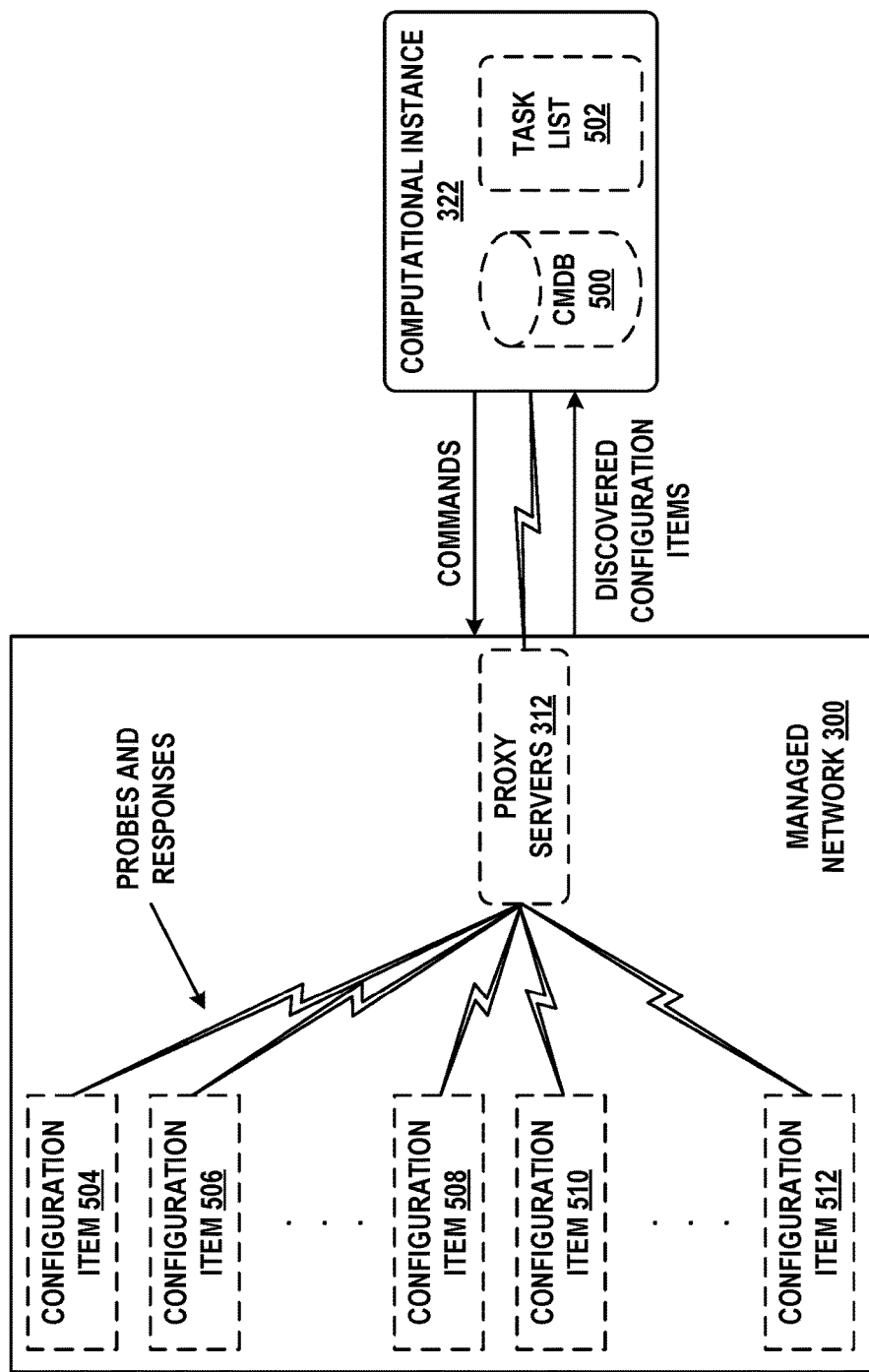
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
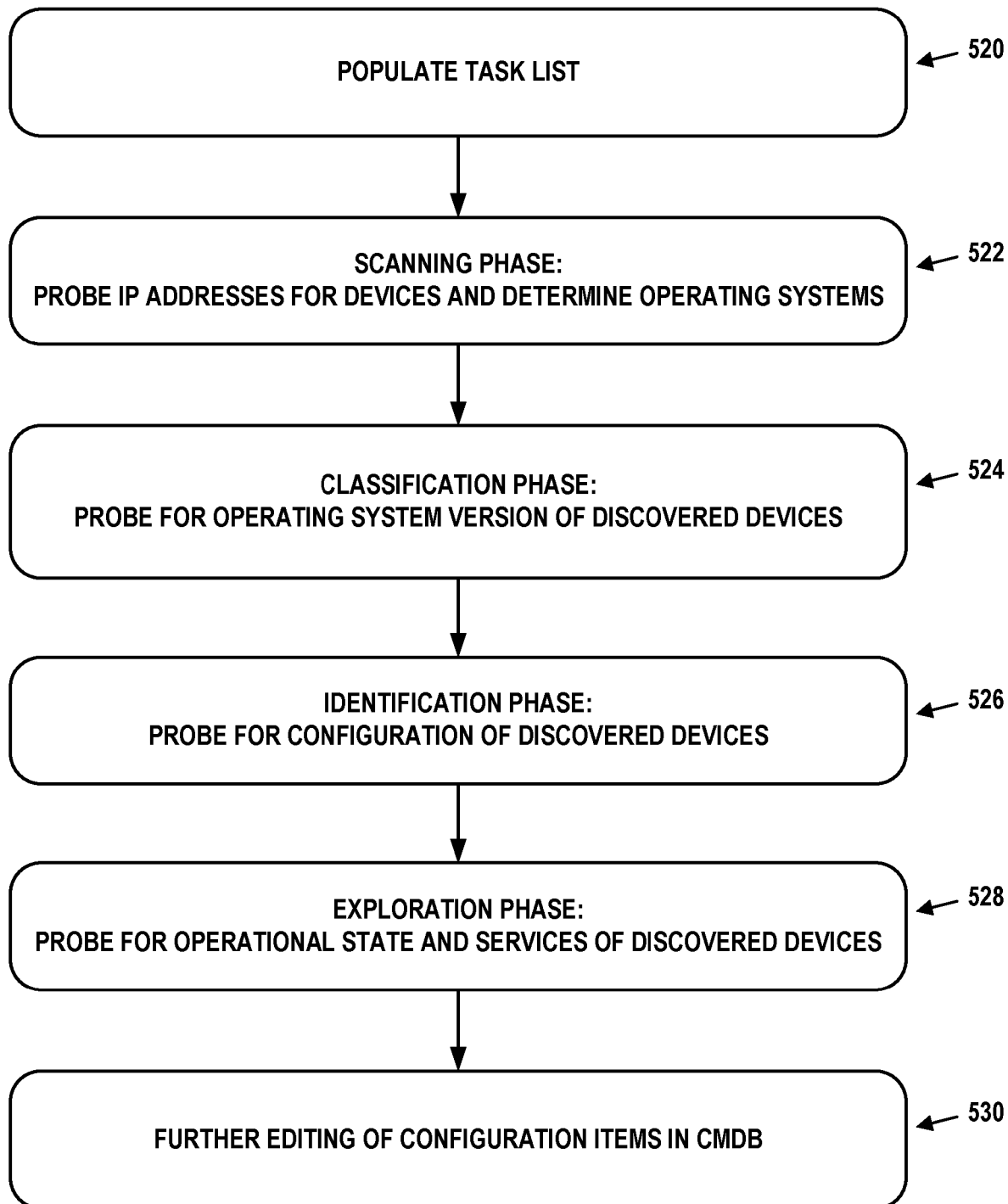
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. DEPLOYMENT OF AGENTS ON ENDPOINT DEVICES

As noted above, traditional discovery is agentless. Thus, a proxy server within a managed network would remotely access or log on to devices disposed within the managed network, and query these devices for configuration and operational information. While agentless discovery is now a key aspect of many forms of IT service management, IT operations management, security operations management, software asset management, and the like, it does have limitations.

Particularly, given the complexity of executing agentless discovery on a large managed network, which could take a number of hours, it might be configured to take place only once per day or once per week. But discovery performed this infrequently might fail to discover certain devices.

The modern workplace may involve numerous users being assigned dedicated mobile devices, such as laptops, tablets, and smartphones. These mobile devices may move from network to network throughout the day, and therefore be in different physical locations and assigned different network addresses (e.g., IP address) on a frequent basis. Thus, agentless discovery may not produce an up-to-date representation of the locations and parameters assigned to these devices.

Further, part of a managed network's workforce may be travelling or otherwise remote, working from the road or from home more than in the managed network's offices. While their devices might be logged into the managed network from time to time (e.g., by way of a VPN), this is not guaranteed to be the case when agentless discovery executes. As a consequence, these devices might not be discovered.

Moreover, a growing amount of server functionality and capacity within a managed network (or operating on behalf of a managed network in a public cloud network) is ephemeral in nature. The hardware of such systems may be virtualized so that it is service-oriented and more efficiently allocated. Some of these virtualized systems may activated (spun up) or deactivated (spun down), on demand so that a virtualized service can respond quickly to variations in demand. Thus, several times per day, or even more frequently, the number and configuration of virtual machines may change. As a result, agentless discovery may be unable to accurately characterize the content of virtualized systems because these systems may alter themselves more frequently than discovery executes.

In order to overcome these disadvantages, agent-based discovery may be used. Software agents may be deployed to endpoint devices associated with the managed network. Some of these devices may be disposed upon the managed network, others may be mobile devices that can access the managed network and/or the remote network management platform remotely, while others are disposed within a public cloud network. The agent may be distributed to endpoint devices as part of a standard installation package, operating system image or configuration. Examples of agents may include osquery, Sensu, Chef, and Puppet, among others.

The agent may be configured to run as an operating system service or in the background. Further, the agent may be in communication with a proxy server—for instance, the agent may be configured to establish a communication session (e.g., a WebSocket or some other form of two-way communication) with a proxy server upon initiation. From time to time, the agent may be triggered to execute and collect information regarding its endpoint device. These triggers may be requests received from the proxy server by way of the communication session, based on expiry of a timer on the endpoint device, or they may take some other form. In the case of timer-based triggers, the acts of collecting information on the endpoint device and reporting it to a proxy server may be decoupled (e.g., the information may be collected and stored, then later reported).

When it is triggered, the agent may execute one or more commands and/or read one or more parameters or settings of the endpoint device. For example, the agent may issue commands by way of a command line interface (CLI), read configuration or operational parameters from a database, registry, and/or file system, and so on. Using these techniques, the agent may gather information related to configuration and/or utilization of processor, memory, and storage resources, lists of installed and/or executing software applications, application error reports, application crash reports, log data, network interface configurations, assigned network addresses, and/or established network connections with other devices, just to name a few possibilities.

The proxy server may process the information received from agents, form it into configuration items, and transmit the configuration item representations to a CMDB for storage. Alternatively, and based on the type or the source of the request or trigger, the proxy server may transmit a representation of the information received a different database (e.g., a database that temporarily stores real-time performance information).

Advantageously, agent-based discovery and monitoring deployments might not require credentials to be provisioned on proxy servers in order to provide their features. This can serve to increase the security of managed networks by eliminating a potential attack vector (the credential file or database) for malware or network intruders.

Figure 6:
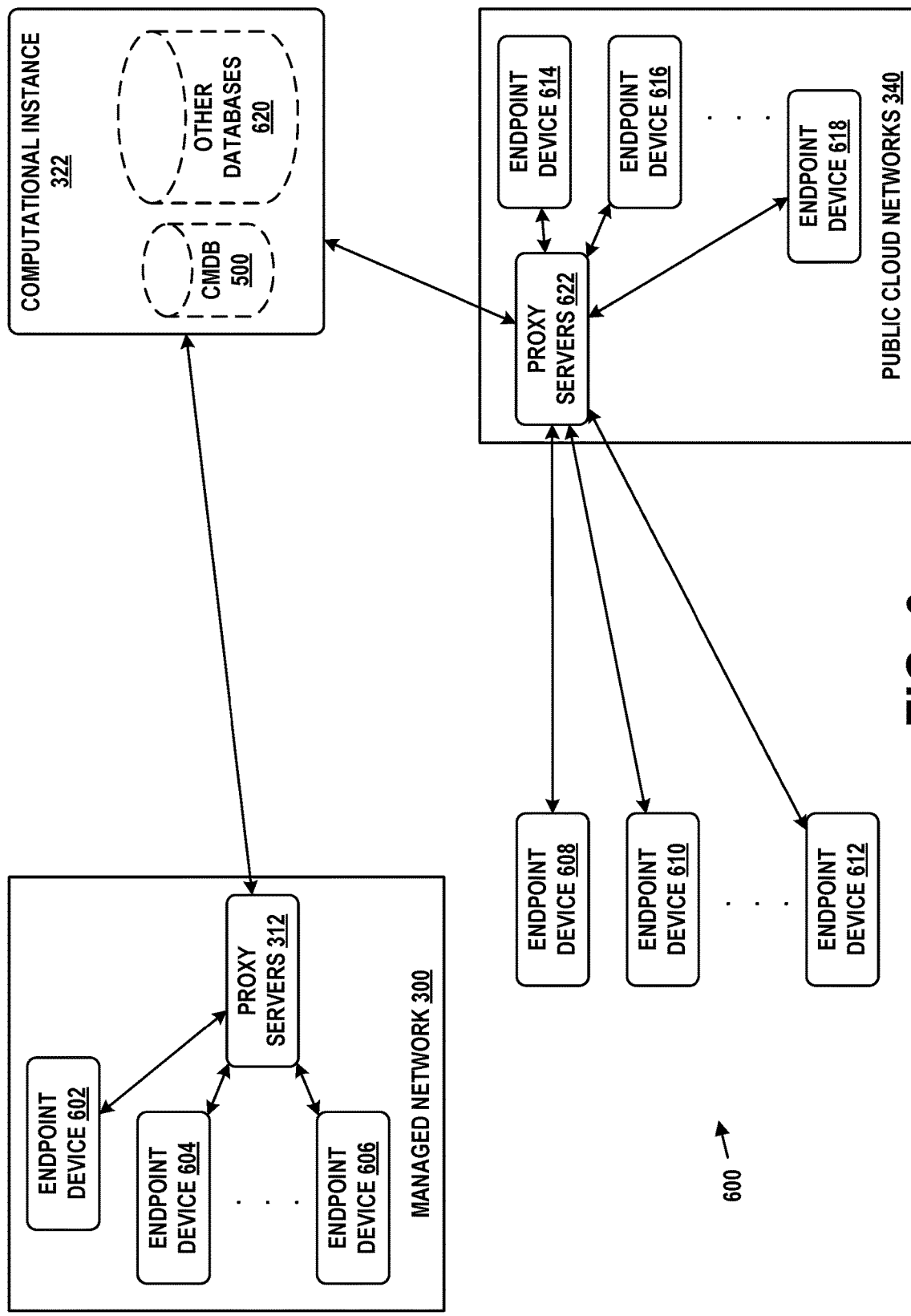
FIG. 6 is an architecture that can support agent-based discovery and agent-based real-time performance monitoring, in accordance with example embodiments.

FIG. 6 depicts example architecture 600 that can support these features. Architecture 600 resembles that of FIG. 3, but provides additional components and details.

Similar to FIG. 3, managed network 300 is communicatively coupled to computational instance 322 (e.g., over Internet 350). Remote network management platform 320 is not shown for purposes of convenience. Public cloud networks 340 are also communicatively coupled to computational instance 322 (e.g., over Internet 350 as well).

Disposed within managed network 300 are endpoint devices 602, 604, and 606. These three endpoint devices represent an array of such endpoint devices that may number in the tens, hundreds, thousands, or more. Endpoint devices 602, 604, and 606 may be configured to communicate with computational instance 322 by way of proxy servers 312. In some embodiments, endpoint devices 602, 604, and 606 are mobile devices, such as laptops, tablets, and/or smartphones. But endpoint devices 602, 604, and 606 could include desktop devices or server devices as well.

Disposed within public cloud networks 340 are endpoint devices 614, 616, and 618. These three endpoint devices also represent an array of such endpoint devices that may number in the tens, hundreds, thousands, or more. Endpoint devices 614, 616, and 618 may be configured to communicate with computational instance 322 by way of proxy servers 622. In some embodiments, endpoint devices 614, 616, and 618 are virtual machines or containerized application frameworks that exist on an ephemeral (e.g., on demand) or semipermanent basis, but could be any other type of computing device. Proxy servers 622 may also be virtualized, and thus the capacity of these servers (e.g., in terms of processing, memory, and/or communications) may expand or shrink with demand.

Also present in architecture 600 are endpoint devices 608, 610, and 612. These three endpoint devices also represent an array of such endpoint devices that may number in the tens, hundreds, thousands, or more. Endpoint devices 608, 610, and 612 may be devices that are operated and/or under the control of managed network 300, but not located within managed network 300. Thus, these devices may be used by employees or contractors who work from home, travel frequently, or need to be able to access managed network and/or computational instance 322 from various remote locations. Like endpoint devices 614, 616, and 618, endpoint devices 608, 610, and 612 may be configured to communicate with computational instance 322 by way of proxy servers 622.

Computational instance 322 may contain CMDB 500 (described above) and/or other databases 620. The latter may include databases that temporarily store, or store on a long-term basis, configuration and performance related information of one or more of the endpoint devices of FIG. 6. Generally, CMDB 500 is used to store discovery-related information, and other databases 620 are used to store information that is not related to discovery. But there may be some overlap between the information stored in these databases.

VI. AGENT-BASED DISCOVERY

Figure 7A:
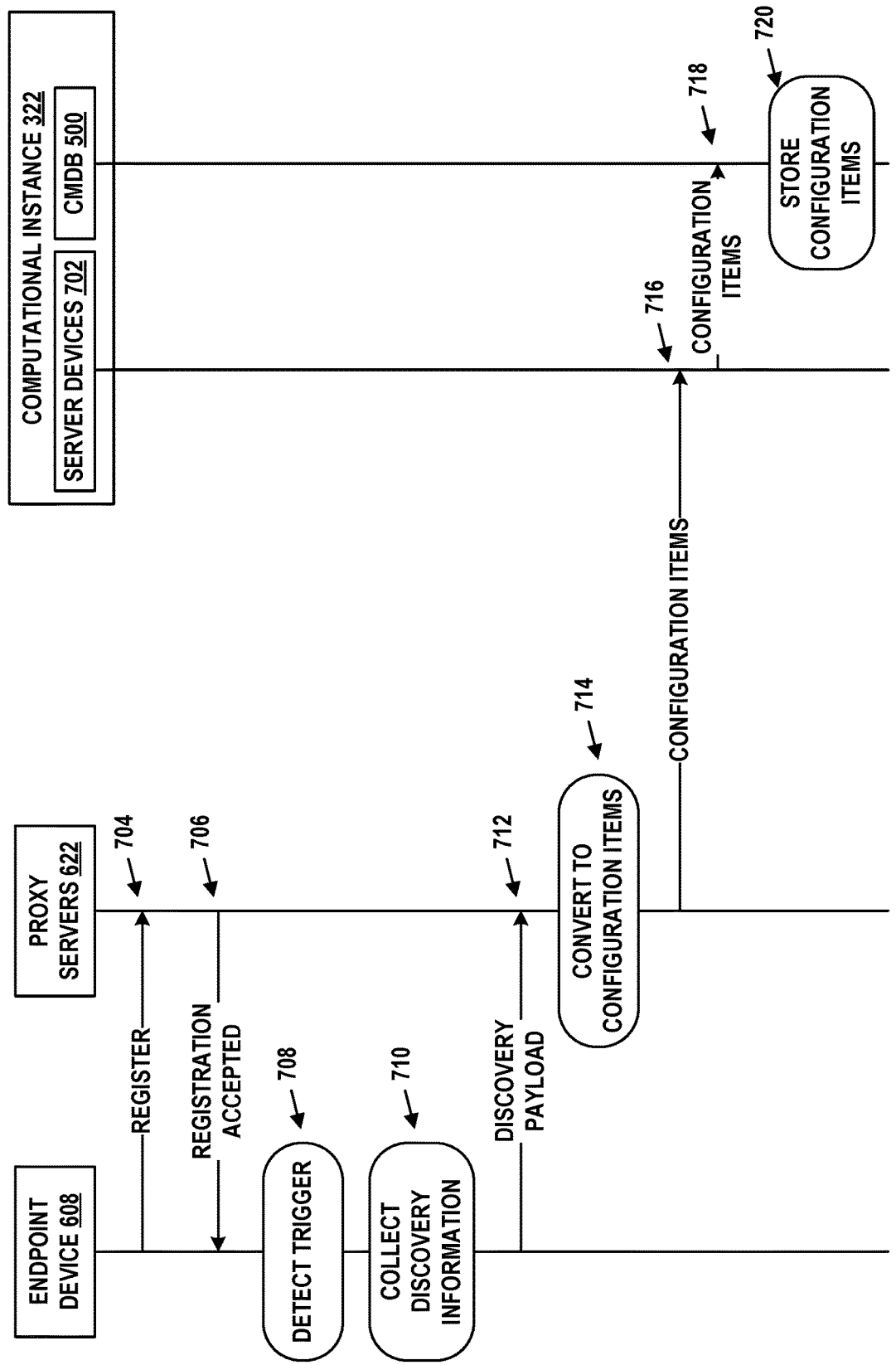
FIG. 7A is a flow chart of agent-based discovery, in accordance with example embodiments.

FIG. 7A is a message flow diagram demonstrating how agent-based discovery might be carried out in the context of a remote network management platform, and by way of proxy servers deployed in managed networks and/or public cloud networks. In message flow diagram 700, endpoint device 608 is configured to communicate discovery information to computational instance 322 by way of proxy servers 622. In other environments, an endpoint device within a managed network (e.g., endpoint device 602) may be configured to use proxy servers within the managed network (e.g., proxy servers 312) for this purpose. Regardless, the endpoint device may be configured with an IP address or domain name of an appropriate proxy server to facilitate this communication.

Step 704 may involve the discovery agent installed on endpoint device 608 transmitting a register message to proxy servers 622. The register message may identify that the endpoint device seeks to establish a registration with proxy servers 622 and is configured to carry out agent-based discovery. Step 706 may involve proxy servers 622 transmitting an acceptance of the registration to endpoint device 608. The acceptance may include information regarding a schedule of when endpoint device 608 should initiate agent-based discovery. For example, the schedule may specify that the discovery agent should collect discovery information and provide a discovery payload with this information to proxy servers 622 once per day or upon detecting certain state changes in endpoint device 608. Steps 704 and 706 may involve endpoint device 608 and proxy servers 622 negotiating and establishing a WebSocket connection, for example.

At step 708, which may take place at some later point in time, endpoint device 608 may detect a trigger that initiates agent-based discovery. This trigger may be a timer that is based on the schedule, the endpoint device booting or otherwise initiating, the discovery agent initiating, or some other factor.

At step 710, and in response to the trigger, the discovery agent may collect discovery information from endpoint device 608. As noted above, this may involve issuing commands by way of a CLI, reading configuration or operational parameters from a database, registry, and/or file system, and so on.

At step 712, this discovery information may be transmitted to proxy servers 622 in the form of a discovery payload. The discovery payload may be formatted in accordance with a protocol used between endpoint device 608 and proxy servers 622. This could be an SQL-like protocol, and XML-based protocol, or a JavaScript Object Notation (JSON) based protocol, as just some examples.

In some embodiments, the discovery agent may record a timestamp of when a discovery payload was most recently transmitted. Then, when the discovery agent initiates, it may check this timestamp to determine when it should send the next discovery payload. For example, if a schedule specifies that a discovery payload should be sent once every 24 hours and more than 24 hours have passed since the last discovery payload was sent, the discovery agent may immediately or responsively carry out steps 710 and 712. If less than 24 hours have passed, the discovery agent may wait until 24 hours have passed before carrying out steps 710 and 712.

At step 714, proxy servers 622 may convert the discovery payload to configuration items. This may involve transforming the discovery information in the discovery payload to a format supported by computational instance 322. For example, this format may arrange data so that it can be easily placed into table entries in CMDB 500.

At step 716, proxy servers 622 may transmit these configuration items to server devices 702. In response, at 718, server device 702 may insert these configuration items into CMDB 500 according to any appropriate procedures for doing so. For example, server devices 702 or CMDB 500 may refrain from inserting duplicate configuration items into CMDB 500, or may carry out de-duplication procedures after the fact. At step 720, CMDB 500 may store the configuration items.

Thus, any configuration item information that is found by way of agent-based discovery may be queried for later review and/or use by applications of computational instance 322. Further, this configuration item information may integrated and/or combined with configuration item information found by way of agentless discovery.

VII. AGENT-BASED REAL-TIME PERFORMANCE MONITORING

In addition or alternatively to the agent-based discovery transactions of message flow diagram 700, agent-based real-time operational information of endpoint devices may be requested and received from these endpoint devices. The same agents on the same endpoint devices may be used for these procedures, or different agents may be used.

Figure 7B:
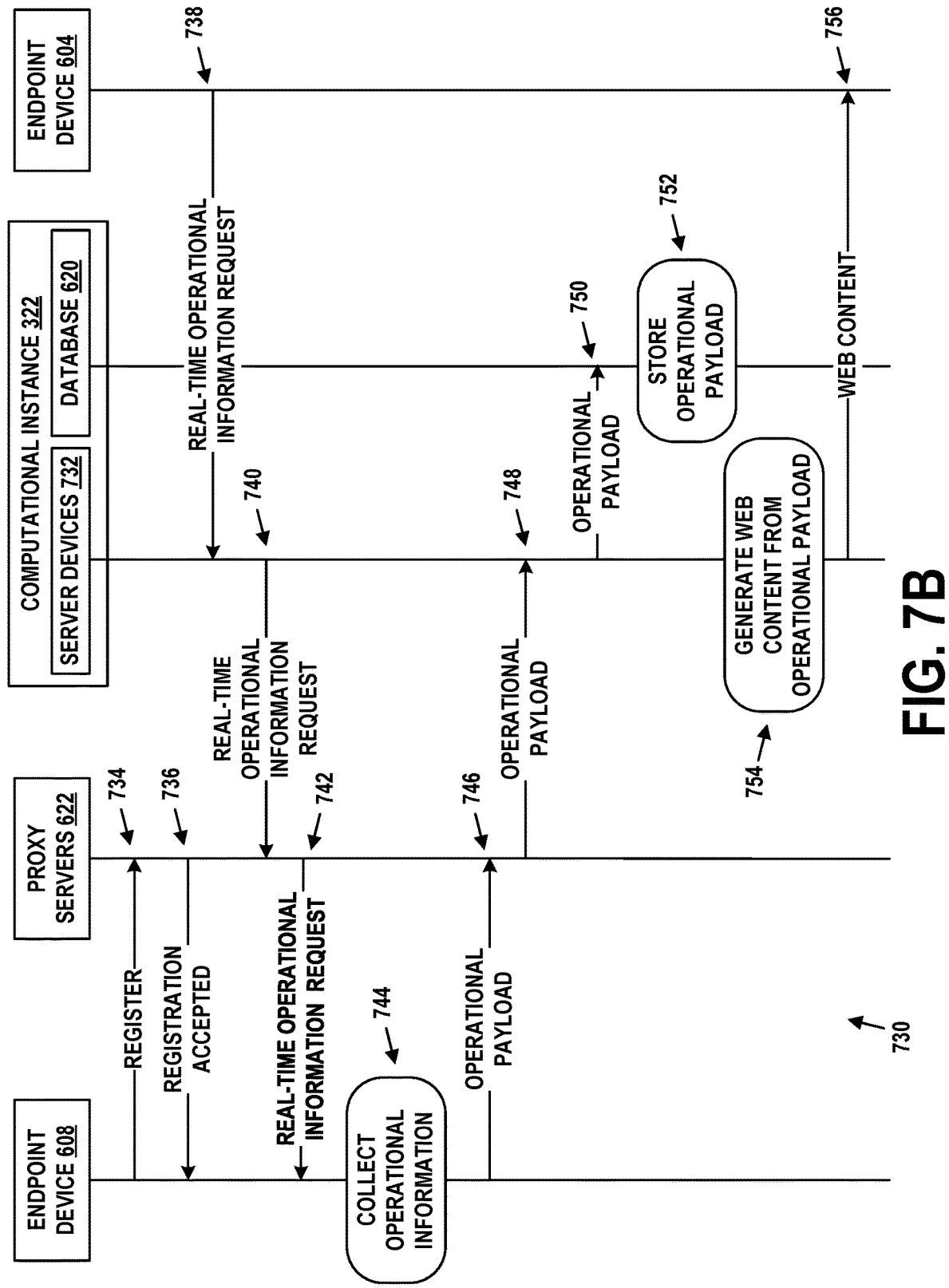
FIG. 7B is a flow chart of agent-based, real-time performance monitoring, in accordance with example embodiments.

FIG. 7B is a message flow diagram demonstrating how real-time operational information might be obtained in the context of a remote network management platform by way of proxy servers deployed in managed networks and/or public cloud networks. In message flow diagram 730, endpoint device 608 is configured to communicate real-time operational information to computational instance 322 by way of proxy servers 622. In other environments, an endpoint device within a managed network (e.g., endpoint device 602) may be configured to use proxy servers within the managed network (e.g., proxy servers 312) for this purpose. Regardless, the endpoint device may be configured with an IP address or domain name of an appropriate proxy server to facilitate this communication.

Step 734 may involve a monitoring agent installed on endpoint device 608 (again, which may be the same agent as the discovery agent described above) transmitting a register message to proxy servers 622. The register message may identify that the endpoint device seeks to establish a registration with proxy servers 622 and is configured provide real-time operational information. Step 736 may involve proxy servers 622 transmitting an acceptance of the registration to endpoint device 608. Steps 734 and 736 may involve endpoint device 608 and proxy servers 622 negotiating and establishing a WebSocket connection, for example. Notably, if the agent supports both agent-based discovery and providing real-time operational information, the same connection (e.g., Web Socket) may be used to facilitate both functions.

At step 738, endpoint device 604 may request real-time operational information of endpoint device 608. In some embodiments, endpoint device 604 may be under the control of IT personnel who are tasked with resolving problems with endpoint device 608. These problems may involve endpoint device 608 not behaving as expected (e.g., applications failing to operate at all or operating too slowly) or being suspected of hosting malware. Endpoint device 604 may represent any device that can communicate with computational instance 322, and thus is not limited to endpoint devices disposed within managed network 300. In some cases, the request may be a pre-defined request (e.g., for processor utilization, memory utilization, running processes, network connections, installed browser plugins, network traffic, and/or a diagnostic overview) or the request may be customized by the user.

At step 740, server devices 732 may transmit the real-time operational information request to proxy servers 622. Server devices 732 may be the same as server devices 702 or consist of different devices in computational instance 322. At step 742, proxy servers 622 may transmit the real-time operational information request to endpoint device 608.

At step 744, the monitoring agent installed on endpoint device 608 may collect operational information from endpoint device 608. As noted above, this may involve the agent issuing commands by way of a CLI, reading configuration or operational parameters from a database, registry, and/or file system, and so on. The agent may gather information related to configuration and/or utilization of processor, memory, and storage resources, lists of installed and/or executing software applications, application error reports, application crash reports, log data, network interface configurations, assigned network addresses, and/or established network connections with other devices, just to name a few possibilities.

At step 746, the monitoring agent may transmit at least some of the collected operational information to proxy servers 622 as an operational payload. The operational payload may be formatted in accordance with a protocol used between endpoint device 608 and proxy servers 622, this could be an SQL-like protocol, and XML-based protocol, or a JavaScript Object Notation (JSON) based protocol, as just some examples.

At step 748, proxy servers 622 may transmit a representation of the operational payload to server device 732. This may involve transforming the real-time operational information in the operational payload to a format supported by computational instance 322. For example, this format may arrange data so that it can be easily placed into table entries in database 620 (it should be clear that database 620 may correspond to other databases 620 in FIG. 6).

At step 750, server devices 732 may insert the representation of the operational payload into database 620 according to any appropriate procedures for doing so. At step 752, database 620 may store this information in one or more tables.

As an example, database 620 may include a triage table for receiving and storing the real-time operational information. The entries of this triage table may have a designated lifetime, such as 24 hours, before which they are automatically deleted to make room for more entries. Notably, database 620 is different from CMDB 500, as the former contains real-time operational information that was collected recently, whereas the latter contains historical data that may have been collected days or weeks in the past. Further, the CMDB might not include the performance-related information stored in database 620, such as measurements of processor utilization, memory utilization, or network utilization.

At step 754, server devices 732 may generate web content (e.g., a web page or part of a web page) from the operational payload and/or the real-time operational information stored in database 620. This may involve making one or more queries to database 620 (not shown) in order to obtain the real-time operational information, and possibly one or more queries to CMDB 500 (not shown) in order to obtain data from the configuration item representing endpoint device 608. At step 756, this web content may be provided to endpoint device 604 in response to the request of step 738. The web content may be a representation of a graphical user interface that is displayable by endpoint device 604.

Figure 8:
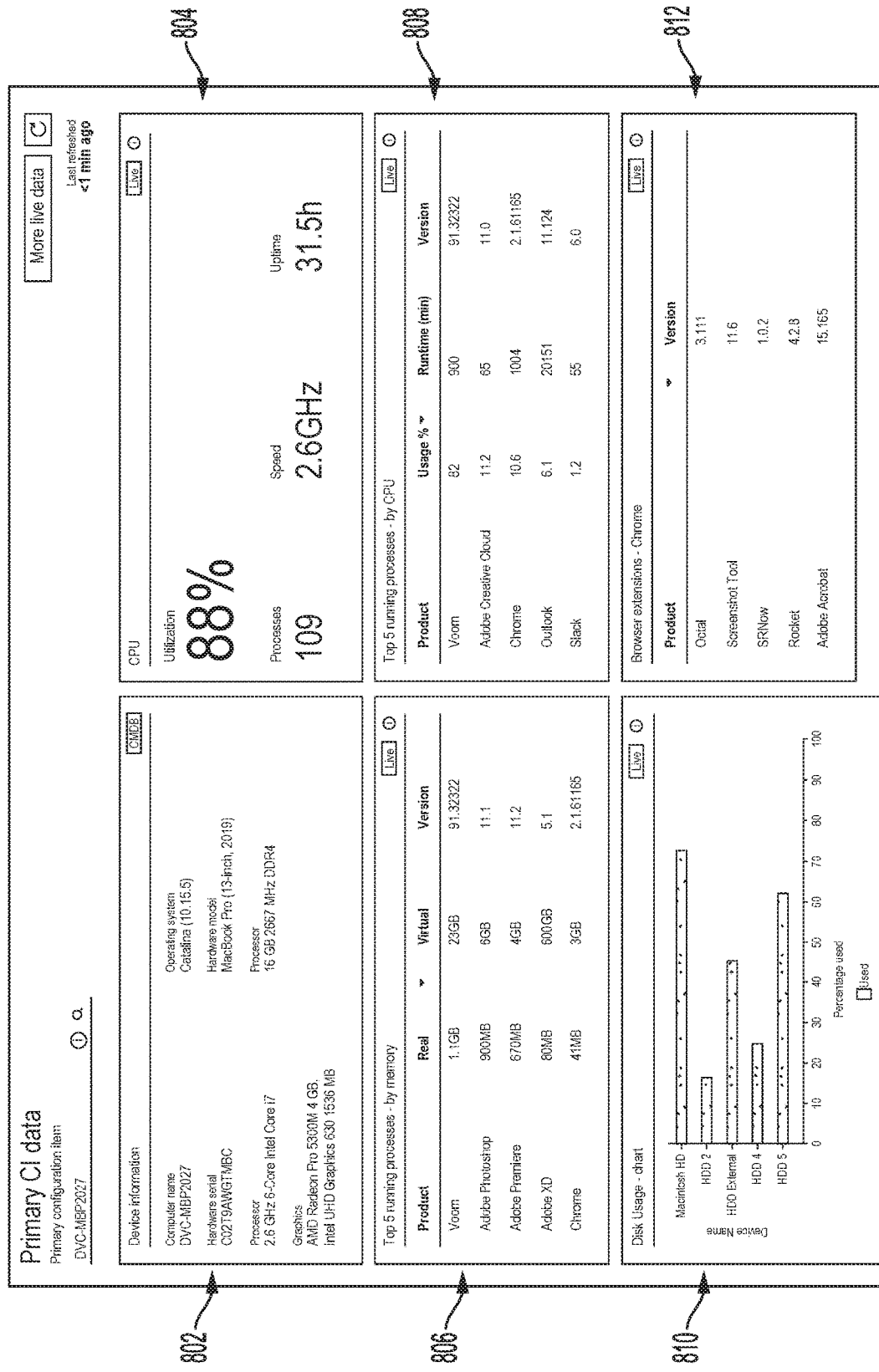
FIG. 8 depicts a graphical user interface supporting agent-based real-time performance monitoring, in accordance with example embodiments.

An example is shown in FIG. 8. Graphical user interface 800 contains data arranged in 6 cards, though more or fewer cards may be used. In some embodiments, the data may be presented using arrangements other than cards, such as lists, tables, or menus.

Card 802 displays configuration information related to endpoint device 608, such as the name of the device, name and version of the operating system, serial number, model, processor type, memory, and graphics chipsets. The information presented in card 802 may have been obtained from the CMDB, as indicated by the text "CMDB" in the upper right hand corner of card 802.

Card 804 displays processor information of endpoint device, such as processor utilization, number of executing processes, processor speed, and system uptime. The information presented in card 804 may have been obtained by querying real-time operational information of endpoint device 608, as indicated by the text "Live" in the upper right hand corner of card 804.

Card 806 displays the top 5 executing processes on endpoint device 608 arranged in decreasing order of memory utilization. The application versions of each process are also shown. The information presented in card 806 may have been obtained by querying real-time operational information of endpoint device 608, as indicated by the text "Live" in the upper right hand corner of card 806.

Card 808 displays the top 5 executing processes on endpoint device 608 arranged in decreasing order of processor utilization. The application versions of each process are also shown. The information presented in card 808 may have been obtained by querying real-time operational information of endpoint device 608, as indicated by the text "Live" in the upper right hand corner of card 808.

Card 810 displays, in a bar chart, the disk usage on endpoint device 608 by disk drive or partition thereof. The information presented in card 810 may have been obtained by querying real-time operational information of endpoint device 608, as indicated by the text "Live" in the upper right hand corner of card 810.

Card 812 displays a list of browser extensions on endpoint device 608 for a particular web browser. The application versions of each extension are also shown. The information presented in card 812 may have been obtained by querying real-time operational information of endpoint device 608, as indicated by the text "Live" in the upper right hand corner of card 812.

From this information, a number of useful details can be determined. For example, the cards show that the "Voom" process is taking up an excessive amount of virtual memory (23 GB) as well as a large portion of processing capacity (82%). If the user of endpoint device 608 is experiencing poor performance (e.g., slow response time), an IT representative may instruct the user to exit the Voom application or otherwise terminate the process.

Thus, the real-time operational information of an endpoint device, such as that which is shown in graphical user interface 800, can be integrated into IT runbooks or playbooks. These runbooks or playbooks may, for example, may define a set of procedures and/or sets of orders steps that IT professionals can take when diagnosing and attempting to fix problems reported by users.

The embodiments herein may also provide enhancements to software asset management applications. Notably, these applications may be used to identify software applications that are installed on or executing on endpoint devices, map these software applications to appropriate software models that define the software applications, and then compare the extent of the deployed software applications to entitlements (licenses) thereto. By carrying out such a mapping, a managed network may be able to efficiently determine whether it has too many or too few entitlements to any identified software application for which a software model is available.

The embodiments herein, through agent-based discovery and/or real-time operational monitoring, may be able to determine the last time that a particular software application was executed on the endpoint device. This time may be recorded in a database (e.g., CMDB 500) to assist software asset management. For instance, a software application that has not been used for a pre-determined period of time (e.g., 3 months, 6 months, or 12 months) may be automatically removed from the endpoint device. This can reduce the overall number of licenses to that software application that the managed network needs to maintain.

The embodiments herein may also be able to detect the software and license usage of virtualized resources (e.g., virtual machines) more accurately than agentless discovery. Indeed, various software licensing arrangements for virtualized software applications may require reporting of the number of images of each application that is executing simultaneously, as well as a count of unique user sessions associated with each image. These values may change from minute-to-minute, and therefore even if agentless discovery is performed relatively frequently (e.g., once per day), this form of discovery may be unable to determine these values accurately.

With agent-based discovery, however, agents executing on a virtualized system can detect when a new virtualized resource is initiated or terminated (e.g., by reading log files, status files, network connections, etc.). These agents may be configured to log the presence of new virtualized resources or the termination of existing virtualized resources. Further, these agents may be able to maintain an accurate count of unique users per virtualized resource. These counts may be also be logged as they change. This logged information may be provided to a computational instance by way of a proxy server during agent-based or agentless discovery. In some embodiments, rather than just logging changes in virtualized resource usage, the agents may be configured to pro-actively report these changes to the computational instance by way of the proxy server.

VIII. EXAMPLE OPERATIONS

Figure 9A:
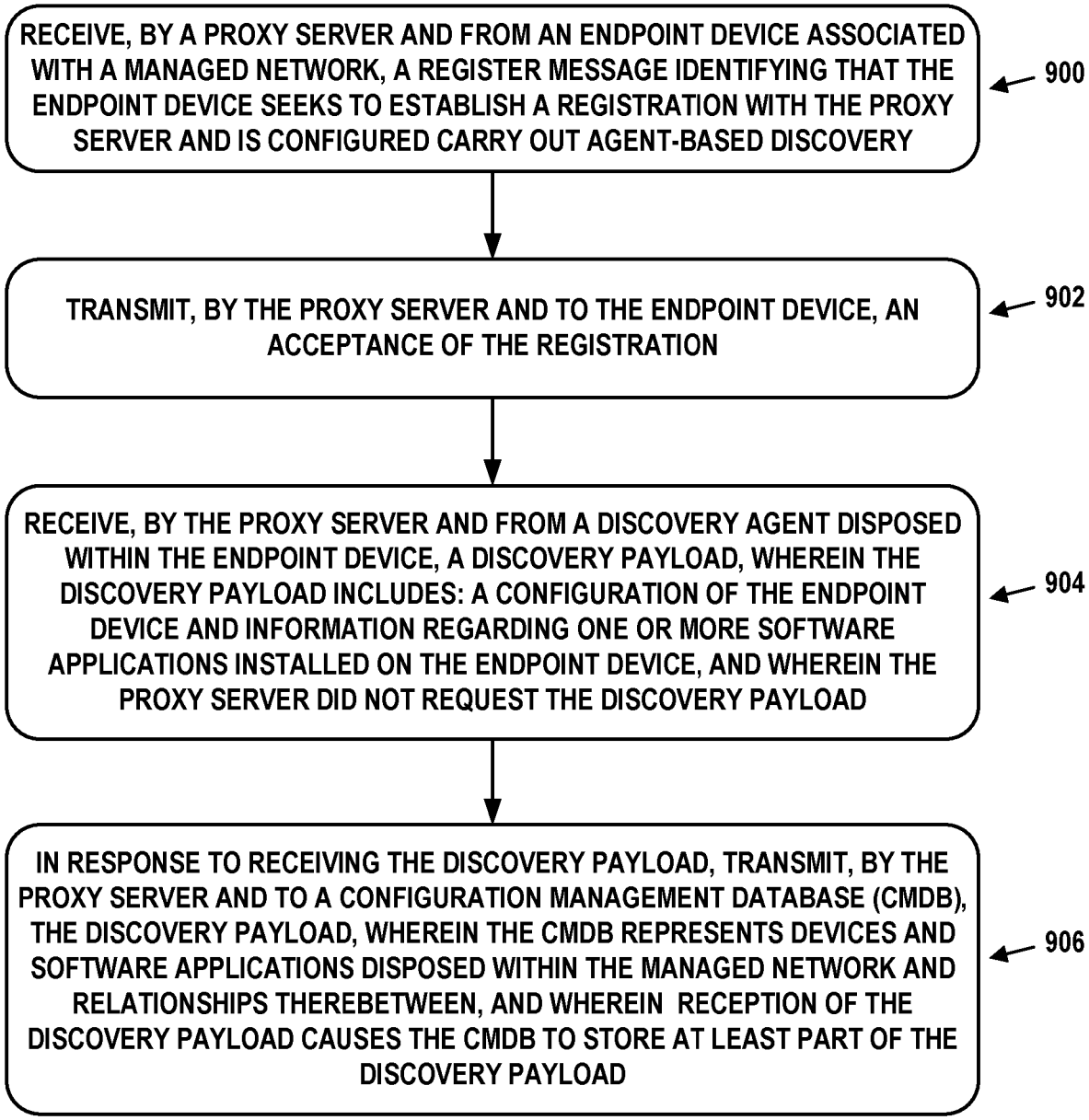
FIG. 9A is a flow chart, in accordance with example embodiments.
Figure 9B:
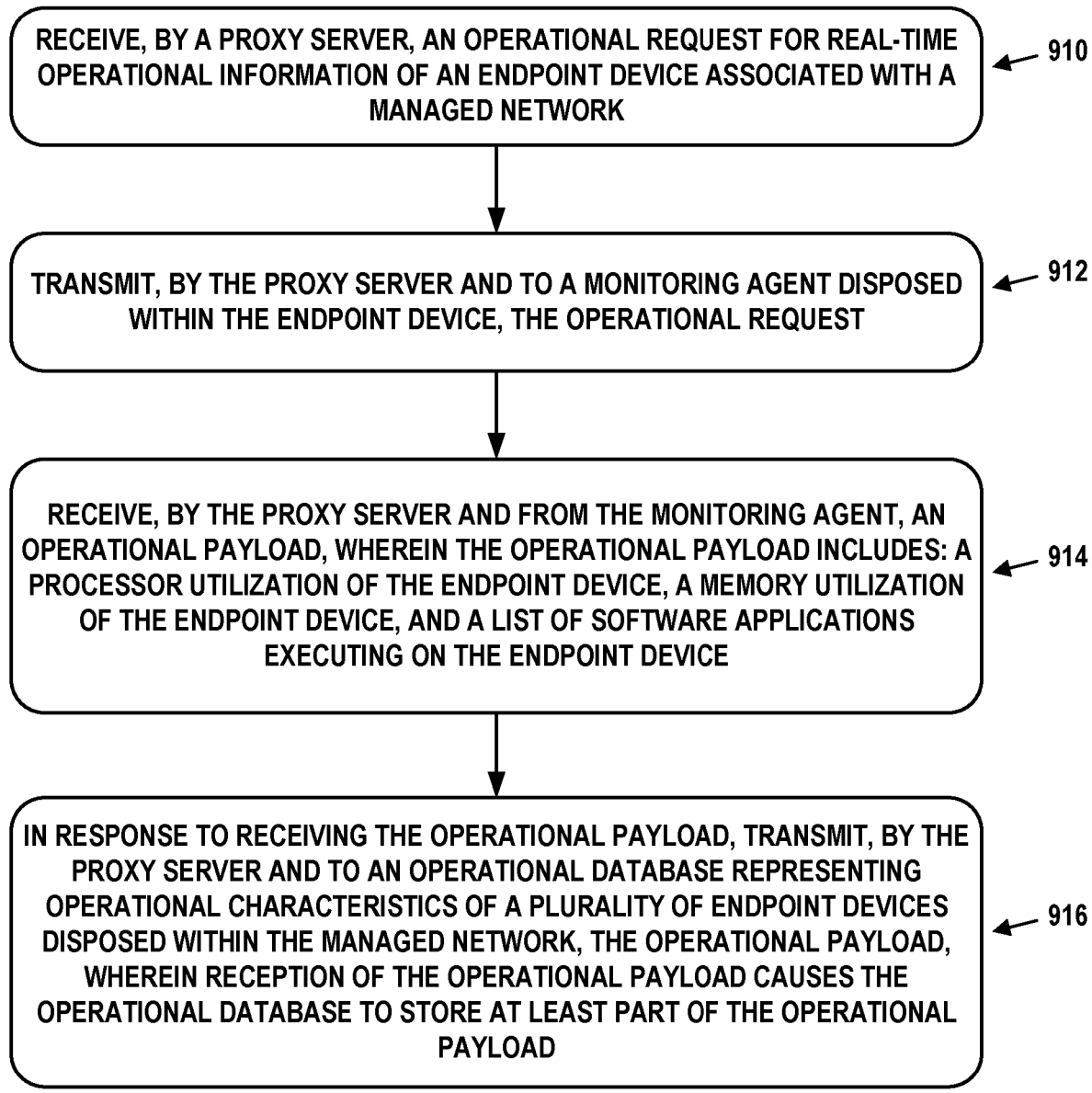
FIG. 9B is a flow chart, in accordance with example embodiments.

FIGS. 9A and 9B are flow charts illustrating example embodiments. The processes illustrated by FIGS. 9A and 9B may be carried out by a computing device, such as computing device 100, and/or a cluster of computing devices, such as server cluster 200. However, the processes can be carried out by other types of devices or device subsystems. For example, the processes could be carried out by a proxy server application configured to operate on a server device or a portable computer.

The embodiments of FIGS. 9A and 9B may be simplified by the removal of any one or more of the features shown therein. Further, these embodiments may be combined with one another and/or with features, aspects, and/or implementations of any of the previous figures or otherwise described herein. In general, FIG. 9A is directed to agent-based discovery, while FIG. 9B is directed to agent-based monitoring. But the embodiments therein can be combined in various ways.

Block 900 of FIG. 9A may involve receiving, by a proxy server and from an endpoint device associated with a managed network, a register message identifying that the endpoint device seeks to establish a registration with the proxy server and is configured carry out agent-based discovery.

Block 902 may involve transmitting, by the proxy server and to the endpoint device, an acceptance of the registration.

Block 904 may involve receiving, by the proxy server and from a discovery agent disposed within the endpoint device, a discovery payload, wherein the discovery payload includes: a configuration of the endpoint device and information regarding one or more software applications installed on the endpoint device, and wherein the proxy server did not request the discovery payload. The proxy server not requesting the discovery payload may be interpreted as: (i) the proxy server not transmitting a request for the discovery payload to the endpoint device, and/or (ii) the endpoint device providing the discovery payload in a fashion that is not in response to a specific request.

Block 906 may involve, possibly in response to receiving the discovery payload, transmitting, by the proxy server and to a CMDB, the discovery payload, wherein the CMDB represents devices and software applications disposed within the managed network and relationships therebetween, and wherein reception of the discovery payload causes the CMDB to store at least part of the discovery payload.

In some embodiments, the proxy server is deployed outside of the managed network.

In some embodiments, the endpoint device is deployed outside of the managed network.

In some embodiments, the endpoint device is a virtual or ephemeral device, existence of which can be initiated and terminated by a controller device. The controller may be a virtualization controller of a virtualized cluster of computational resources.

In some embodiments, the endpoint device is configured to transmit discovery payloads to the proxy server based on a pre-determined schedule, wherein reception of the discovery payload was caused by the discovery agent determining that the pre-determined schedule indicates that the discovery payload is to be transmitted. The pre-determined schedule may indicate that agent-based discovery is to be carried out twice per day, once per day, one every other day, or based on some other frequency.

In some embodiments, the endpoint device is configured to check the pre-determined schedule during boot or initiation procedures. If agent-based discovery has not been performed since the last time it was scheduled to be performed, the discovery agent may perform agent-based discovery.

In some embodiments, the configuration of the endpoint device includes information regarding processors, memory, networking interfaces, and one or more network addresses of the endpoint device.

In some embodiments, transmitting the discovery payload to the CMDB comprises: (i) converting the discovery payload into configuration items formatted to correspond to table entries of the CMDB; and (ii) transmitting the configuration items to the CMDB.

Some embodiments may further involve: (i) receiving, by the proxy server, an operational request for real-time operational information of the endpoint device; (ii) transmitting, by the proxy server and to a monitoring agent disposed within the endpoint device, the operational request, (iii) receiving, by the proxy server and from the monitoring agent, an operational payload, wherein the operational payload includes: a processor utilization of the endpoint device, a memory utilization of the endpoint device, and a list of the software applications executing on the endpoint device; and (iv) perhaps in response to receiving the operational payload, transmitting, by the proxy server, the operational payload to an operational database, wherein the operational database represents operational characteristics of a plurality of endpoint devices disposed within the managed network, and wherein reception of the operational payload causes the operational database to store at least part of the operational payload. In some situations, the monitoring agent and the discovery agent may be the same agent.

Turning to FIG. 9B, block 910 may involve receiving, by a proxy server, an operational request for real-time operational information of an endpoint device associated with a managed network.

Block 912 may involve transmitting, by the proxy server and to a monitoring agent disposed within the endpoint device, the operational request.

Block 914 may involve receiving, by the proxy server and from the monitoring agent, an operational payload, wherein the operational payload includes: a processor utilization of the endpoint device, a memory utilization of the endpoint device, and a list of software applications executing on the endpoint device.

Block 916 may involve, possibly in response to receiving the operational payload, transmitting, by the proxy server and to an operational database representing operational characteristics of a plurality of endpoint devices disposed within the managed network, the operational payload, wherein reception of the operational payload causes the operational database to store at least part of the operational payload.

In some embodiments, the proxy server is deployed outside of the managed network.

In some embodiments, the endpoint device is deployed outside of the managed network.

In some embodiments, the endpoint device is a virtual or ephemeral device, existence of which can be initiated and terminated by a controller device. The controller may be a virtualization controller of a virtualized cluster of computational resources.

In some embodiments, the operational payload also includes a non-volatile storage utilization of the endpoint device.

In some embodiments, the list of software applications executing on the endpoint device includes processor utilization and memory utilization of each of the software applications.

Some embodiments may further involve, prior to receiving the operational request: (i) receiving, from the endpoint device, a register message identifying that the endpoint device seeks to establish a registration with the proxy server and is configured carry out agent-based monitoring; and (ii) transmitting, to the endpoint device, an acceptance of the registration.

In some embodiments, the operational request was originated by a client device. These embodiments may further involve: (i) generating, for display on the client device, a representation of a graphical user interface, the representation containing one or more values from the operational payload visually arranged into categories related to the processor utilization of the endpoint device, the memory utilization of the endpoint device, and the software applications executing on the endpoint device; and (ii) transmitting, to the client device, the representation. The graphical user interface may be or resemble that of FIG. 8.

In some embodiments, a CMDB represents devices and software applications disposed within the managed network and relationships therebetween, wherein the representation of the graphical user interface includes a category related to static information of the endpoint device that was retrieved from the CMDB.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments.

Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
 persistent storage including a configuration management database (CMDB) representing devices and software applications disposed within a managed network, and relationships therebetween; and
 a proxy server configured to relay discovery information between a plurality of endpoint devices associated with the managed network and the CMDB, wherein respective discovery agents are disposed within each of the endpoint devices, wherein the respective discovery agents are software applications executing on the endpoint devices and configured to communicate by way of the proxy server, and wherein the proxy server contains one or more processors configured to execute program instructions that perform operations including:
   receiving, from a discovery agent disposed within an endpoint device of the plurality of endpoint devices, a discovery payload, wherein the discovery payload includes: a configuration of the endpoint device and information regarding one or more software applications installed on the endpoint device, wherein the proxy server did not request the discovery payload, and wherein reception of the discovery payload was caused by the discovery agent checking a pre-determined payload transmission schedule during boot or initiation procedures and determining that the pre-determined payload transmission schedule indicates that the discovery payload is to be transmitted; and
   in response to receiving the discovery payload, transmitting, by the proxy server, the discovery payload to the CMDB, wherein reception of the discovery payload causes the CMDB to store at least part of the discovery payload.

2. The system of claim 1, wherein the proxy server is deployed outside of the managed network.

3. The system of claim 1, wherein at least some of the endpoint devices are deployed outside of the managed network.

4. The system of claim 1, wherein the endpoint device is a virtual or ephemeral device, existence of which can be initiated and terminated by a controller device.

5. The system of claim 1, wherein the configuration of the endpoint device includes information regarding processors, memory, networking interfaces, and one or more network addresses of the endpoint device.

6. The system of claim 1, wherein transmitting the discovery payload to the CMDB comprises:
 converting the discovery payload into configuration items formatted to correspond to table entries of the CMDB; and
 transmitting the configuration items to the CMDB.

7. The system of claim 1, wherein the operations further include, prior to receiving the discovery payload:
 receiving, from the endpoint device, a register message identifying that the endpoint device seeks to establish a registration with the proxy server and is configured carry out agent-based discovery; and
 transmitting, to the endpoint device, an acceptance of the registration.

8. The system of claim 1, wherein the persistent storage also includes an operational database representing operational characteristics of the plurality of endpoint devices, wherein the proxy server is configured to relay operational information between the plurality of endpoint devices and the operational database, wherein respective monitoring agents are disposed within each of the endpoint devices, and wherein the operations further include:
 receiving an operational request for real-time operational information of the endpoint device;
 transmitting, to a monitoring agent disposed within the endpoint device, the operational request;
 receiving, from the monitoring agent, an operational payload, wherein the operational payload includes: a processor utilization of the endpoint device, a memory utilization of the endpoint device, and a list of the software applications executing on the endpoint device; and in response to receiving the operational payload, transmitting, by the proxy server, the operational payload to the operational database, wherein reception of the operational payload causes the operational database to store at least part of the operational payload.

9. A system comprising:

persistent storage including an operational database representing operational characteristics of a plurality of endpoint devices disposed within a managed network; and a proxy server configured to relay operational information between the plurality of endpoint devices and the operational database, wherein respective monitoring agents are disposed within each of the endpoint devices, wherein the respective monitoring agents are software applications executing on the endpoint devices and configured to communicate by way of the proxy server, and wherein the proxy server contains one or more processors configured to execute program instructions that perform operations including:

receiving an operational request for real-time operational information of an endpoint device of the plurality of endpoint devices;

transmitting, to a monitoring agent disposed within the endpoint device, the operational request;

receiving, from the monitoring agent, an operational payload, wherein the operational payload includes: a processor utilization of the endpoint device, a memory utilization of the endpoint device, and a list of software applications executing on the endpoint device, wherein the list of software applications executing on the endpoint device includes processor utilization and memory utilization of each of the software applications; and in response to receiving the operational payload, transmitting, by the proxy server, the operational payload to the operational database, wherein reception of the operational payload causes the operational database to store at least part of the operational payload.

10. The system of claim 9, wherein the proxy server is deployed outside of the managed network.

11. The system of claim 9, wherein at least some of the endpoint devices are deployed outside of the managed network.

12. The system of claim 9, wherein the endpoint device is a virtual or ephemeral device, existence of which can be initiated and terminated by a controller device.

13. The system of claim 9, wherein the operational payload also includes a non-volatile storage utilization of the endpoint device.

14. The system of claim 9, wherein the operations further include, prior to receiving the operational request:

receiving, from the endpoint device, a register message identifying that the endpoint device seeks to establish a registration with the proxy server and is configured carry out agent-based monitoring; and transmitting, to the endpoint device, an acceptance of the registration.

15. The system of claim 9, wherein the operational request was originated by a client device, and wherein the operations further comprise:

generating, for display on the client device, a representation of a graphical user interface, the representation containing one or more values from the operational payload visually arranged into categories related to the processor utilization of the endpoint device, the memory utilization of the endpoint device, and the software applications executing on the endpoint device; and transmitting, to the client device, the representation.

16. The system of claim 15, wherein the persistent storage also includes a configuration management database (CMDB) representing devices and software applications disposed within the managed network and relationships therebetween, and wherein the representation of the graphical user interface includes a category related to static information of the endpoint device that was retrieved from the CMDB.

17. A computer-implemented method comprising:

receiving, by a proxy server and from an endpoint device associated with a managed network, a register message identifying that the endpoint device seeks to establish a registration with the proxy server and is configured to carry out agent-based discovery relating to a configuration of the endpoint device and software applications installed on the endpoint device;

transmitting, by the proxy server and to the endpoint device, an acceptance of the registration;

receiving, by the proxy server and from a discovery agent disposed within the endpoint device, a discovery payload, wherein the discovery agent is a software application executing on the endpoint device and configured to communicate by way of the proxy server, wherein the discovery payload includes: the configuration of the endpoint device and information regarding one or more of the software applications installed on the endpoint device, wherein the proxy server did not request the discovery payload, and wherein reception of the discovery payload was caused by the discovery agent checking a pre-determined payload transmission schedule during boot or initiation procedures and determining that the pre-determined payload transmission schedule indicates that the discovery payload is to be transmitted; and in response to receiving the discovery payload, transmitting, by the proxy server and to a configuration management database (CMDB), the discovery payload, wherein the CMDB represents devices and software applications disposed within the managed network and relationships therebetween, and wherein reception of the discovery payload causes the CMDB to store at least part of the discovery payload.

* * * * *